(12) United States Patent
Wakisaka et al.

(10) Patent No.: US 10,744,842 B2
(45) Date of Patent: Aug. 18, 2020

(54) VEHICULAR AIR CONDITIONING DEVICE

(71) Applicant: DENSO CORPORATION, Kariya, Aichi-pref. (JP)

(72) Inventors: Takeshi Wakisaka, Kariya (JP); Takehiro Sato, Kariya (JP); Yoshinori Ichishi, Kariya (JP); Akira Ito, Nagakute (JP); Tatsuyuki Matsubara, Toyota (JP); Yoshinori Okuno, Okazaki (JP); Tatsuru Tanaka, Okazaki (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 77 days.

(21) Appl. No.: 16/073,347

(22) PCT Filed: Dec. 1, 2016

(86) PCT No.: PCT/JP2016/085658
§ 371 (c)(1),
(2) Date: Jul. 27, 2018

(87) PCT Pub. No.: WO2017/130560
PCT Pub. Date: Aug. 3, 2017

(65) Prior Publication Data
US 2019/0039433 A1 Feb. 7, 2019

(30) Foreign Application Priority Data

Jan. 29, 2016 (JP) .................................. 2016-015608

(51) Int. Cl.
*B60H 1/00* (2006.01)
(52) U.S. Cl.
CPC ..... *B60H 1/00071* (2013.01); *B60H 1/00392* (2013.01); *B60H 1/00485* (2013.01);
(Continued)

(58) Field of Classification Search
CPC ............ B60H 1/00071; B60H 1/00285; B60H 1/00785; B60H 1/00864; B60H 1/00885;
(Continued)

(56) References Cited

U.S. PATENT DOCUMENTS

2005/0279842 A1* 12/2005 Mondry ............. B60H 1/00735
236/46 C
2011/0067422 A1* 3/2011 Ichishi ................ B60H 3/0085
62/176.1
(Continued)

FOREIGN PATENT DOCUMENTS

JP 2000318435 A 11/2000
JP 2001130247 A 5/2001
(Continued)

*Primary Examiner* — Marc E Norman
(74) *Attorney, Agent, or Firm* — Harness, Dickey & Pierce, P.L.C.

(57) ABSTRACT

A vehicular air conditioning device includes a blower, a heating heat exchanger, an auxiliary heater, and a blower controller. The heating heat exchanger heats blown air by exchanging heat between the blown air and the cooling water of the in-vehicle device emitting heat during operation. The blower controller is configured to control the operation of the blower. The blower controller is configured to increase a blowing capacity of the blower with increase of a temperature of the cooling water. The blower controller, during operation of the auxiliary heater, increases the blowing capacity after a waiting time during which the increase of the blowing capacity is prohibited has elapsed since a start-up switch of a vehicle system is turned on. The vehicular air conditioning is capable of implementing a quick warming of the in-vehicle device without impairing the heating feeling of occupant.

9 Claims, 10 Drawing Sheets

(52) U.S. Cl.
CPC ..... *B60H 1/00785* (2013.01); *B60H 1/00864* (2013.01); *B60H 1/00885* (2013.01); *B60H 1/00892* (2013.01); *B60H 1/00914* (2013.01); *B60H 2001/003* (2013.01); *B60H 2001/00128* (2013.01); *B60H 2001/00733* (2019.05)

(58) Field of Classification Search
CPC ...... B60H 1/00892; B60H 2001/00128; B60H 2001/003; B60H 2001/00733
See application file for complete search history.

(56) References Cited

U.S. PATENT DOCUMENTS

| | | | | |
|---|---|---|---|---|
| 2013/0232996 | A1* | 9/2013 | Goenka | B60N 2/56 62/3.61 |
| 2014/0144998 | A1* | 5/2014 | Ichishi | B60H 1/00314 237/12.3 A |
| 2018/0134122 | A1* | 5/2018 | Ichishi | F02D 29/02 |
| 2019/0039438 | A1* | 2/2019 | Wakisaka | B60H 1/3205 |

FOREIGN PATENT DOCUMENTS

| | | | |
|---|---|---|---|
| JP | 2007069698 | A | 3/2007 |
| JP | 2011020478 | A | 2/2011 |
| JP | 2015105604 | A | 6/2015 |

\* cited by examiner

VEHICULAR AIR CONDITIONING DEVICE

CROSS REFERENCE TO RELATED APPLICATIONS

This application is a U.S. National Phase Application under 35 U.S.C. 371 of International Application No. PCT/JP2016/085658 filed on Dec. 1, 2016 and published in Japanese as WO 2017/130560 A1 on Aug. 3, 2017. This application is based on and claims the benefit of priority from Japanese Patent Application No. 2016-015608 filed on Jan. 29, 2016. The entire disclosures of all of the above applications are incorporated herein by reference.

TECHNICAL FIELD

The present disclosure relates to a vehicular air conditioning device that heats blown air sent to a vehicle compartment by using cooling water for in-vehicle device generating heat during operation as a heat source.

BACKGROUND ART

Conventionally, Patent Document 1 discloses a vehicle air conditioning device which performs heating of a vehicle compartment by heating blown air sent to the vehicle compartment by using, as a heat source, cooling water for an internal combustion engine that is an in-vehicle device emitting heat during operation (i.e. an engine outputting a driving force for vehicle travelling).

More specifically, the vehicular air conditioning device of Patent Document 1 includes a heater core which is a heating heat exchanger for heating the blown air by exchanging heat between the cooling water and the blown air. Furthermore, Patent Document 1 also describes that the blowing capacity of a blower that blows the blown air is increased as the temperature of the cooling water rises.

PRIOR ART DOCUMENT

Patent Document

[Patent Document 1] JP 2011-20478 A

SUMMARY OF THE INVENTION

However, when the blowing capacity of the blower is increased with increase of the cooling water temperature at the time of starting the engine as in the vehicular air conditioning device of Patent Document 1, the heat of the cooling water is easily dissipated by the heater core, and accordingly the cooling water temperature may be unlikely to increase. As a result, the warm-up of the engine is delayed, and the fuel economy of the vehicle may be reduced.

In view of the above, it is an object of the present disclosure to provide a vehicular air conditioning device capable of quickly warming up an in-vehicle device without impairing a heating feeling of an occupant.

According to an aspect of the present disclosure, a vehicular air conditioning device includes a blower, a heating heat exchanger, an auxiliary heater, and a blower controller. The blower is configured to send blown air into a vehicle compartment. The heating heat exchanger heats the blown air by exchanging heat between the blown air and the cooling water of the in-vehicle device emitting heat during operation. The auxiliary heater provides a feeling of heating to the occupant. The blower controller is configured to control the operation of the blower. The blower controller is configured to increase a blowing capacity of the blower with increase of a temperature of the cooling water. The blower controller, during operation of the auxiliary heater, increases the blowing capacity after a waiting time during which the increase of the blowing capacity is prohibited has elapsed since a start-up switch of a vehicle system is turned on.

According to this, during operation of the auxiliary heater, the blower controller does not increase the blowing capacity of the blower until the waiting time has elapsed since the start-up switch of the vehicle system is turned on. Accordingly, in the heat of the cooling water, an increase of the amount of heat released to the blown air in the heating heat exchanger. As a result, the temperature of the cooling water can be quickly increased, and accordingly heating of the in-vehicle device can be enhanced.

Furthermore, it is possible to reduce the energy consumption of the blower, and it is possible to improve the fuel economy of the vehicle. In addition to this, since the auxiliary heater is in operation at least until the waiting time elapses, it is possible to prevent the warming feeling of the occupant from being impaired.

That is, according to the this aspect, the vehicular air conditioning device can be provided in which quick warming up of the in-vehicle device can be realized without impairing the heating feeling of the occupant.

Specifically, an internal combustion engine that outputs driving force for vehicle traveling may be adopted as the in-vehicle device in this aspect. The "vehicle system" of this aspect indicates the entire control target system mounted on a vehicle that includes not only the vehicular air-conditioning device, but also a driving device that outputs a driving force for vehicle traveling (that is, an engine).

EMBODIMENTS FOR CARRYING OUT INVENTION

Hereinbelow, an embodiment of the present disclosure will be described with reference to FIGS. 1 to 10. A vehicular air-conditioning device 1 of the present embodiment is mounted on a vehicle which obtains a driving force for vehicle traveling from an internal combustion engine (engine) EG. The engine EG is an in-vehicle device that generates heat during operation.

Figure 1:
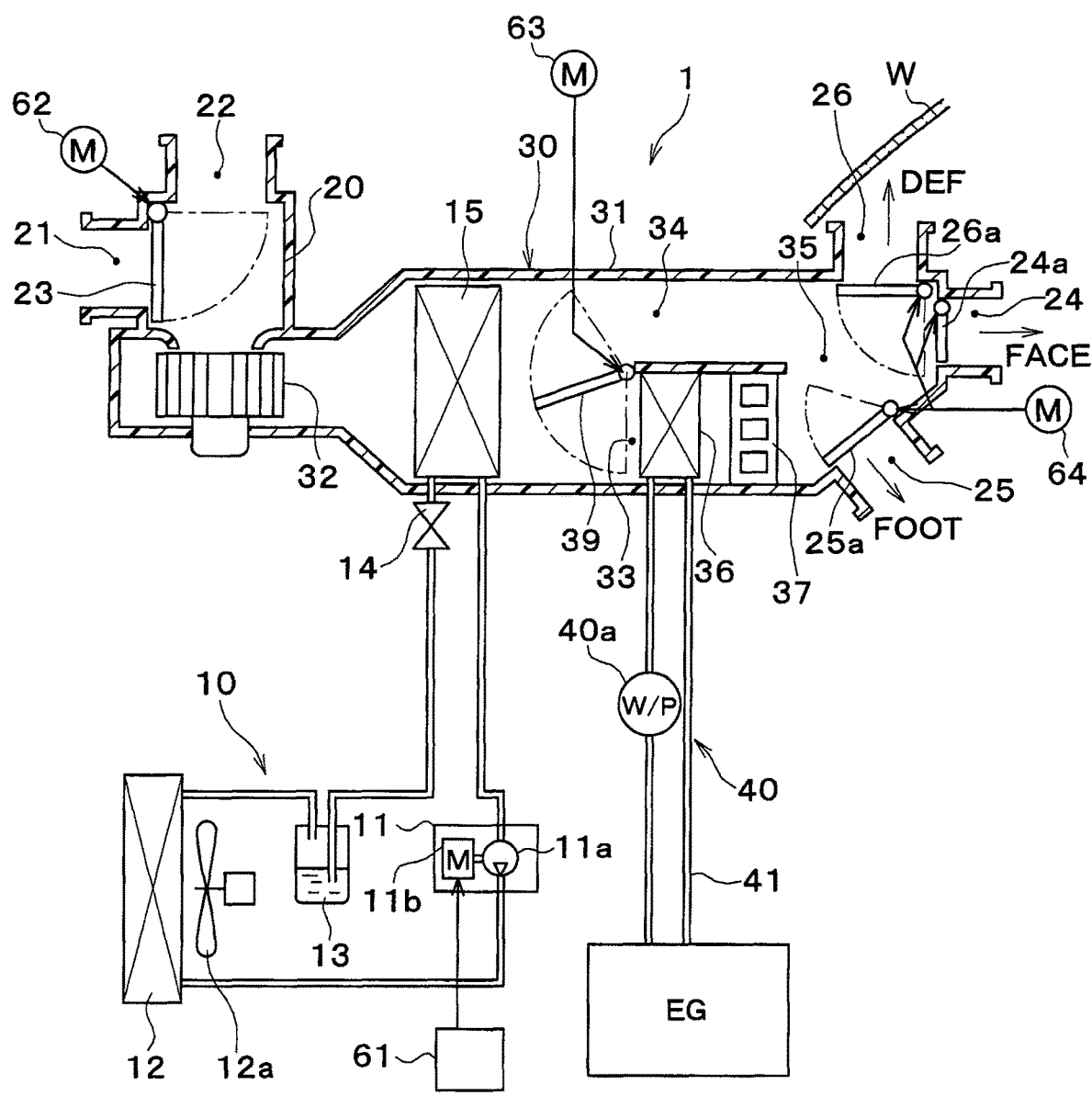
FIG. 1 is a diagram illustrating a vehicular air conditioning device of an embodiment of the present disclosure.

As illustrated in FIG. 1, the vehicular air-conditioning device 1 of the present embodiment includes a refrigeration cycle device 10, an inside air-conditioning unit 30, and an air-conditioning controller 50. Various constituent devices for blowing the air-conditioning air into the vehicle compartment are integrated (that is, unitized) to construct the inside air-conditioning unit 30. The inside air-conditioning unit 30 is disposed inside an instrument panel at the foremost part of the inside of the vehicle compartment.

The inside air-conditioning unit 30 includes a casing 31 which forms an outer shell of the inside air-conditioning unit 30 and forms an air passage through which air blown into the vehicle compartment flows inside thereof. The casing 31 is formed of a resin having a certain degree of elasticity and an excellent strength (e.g., polypropylene).

A blower 32, an evaporator 15, an air mix door 39, a heater core 36, and a PTC heater 37 are disposed in the air passage formed inside the casing 31. An inside-outside air switching device 20 is disposed on the most upstream side in the blown air flow of the casing 31. The inside-outside air switching device 20 switches and introduces inside air (that is, air inside the vehicle compartment) and outside air (that is, air outside the vehicle compartment).

An inside air introduction port 21 and an outside air introduction port 22 are formed on the inside-outside air switching device 20. The inside air introduction port 21 is an open hole for introducing the inside air into the casing 31. The outside air introduction port 22 is an open hole for introducing the outside air into the casing 31. Further, an inside-outside air switching door 23 is disposed inside the inside-outside air switching device 20.

The inside-outside air switching door 23 continuously changes the open area of the inside air introduction port 21 and the open area of the outside air introduction port 22 to switch a suction port mode. The suction port mode switched by the inside-outside air switching door 23 includes an all-inside air mode, an all-outside air mode, and an inside-outside air mixing mode.

In the all-inside air mode, the inside air introduction port 21 is fully open and the outside air introduction port 22 is fully closed to introduce the inside air to the air passage inside the casing 31. In the all-outside air mode, the inside air introduction port 21 is fully closed and the outside air introduction port 22 is fully open to introduce the outside air to the air passage inside the casing 31.

In the inside-outside air mixing mode, the open area of the inside air introduction port 21 and the open area of the outside air introduction port 22 are continuously adjusted to continuously change an air volume ratio between the volume of inside air and the volume of outside air, the inside air and the outside air being introduced to the air passage inside the casing 31. The inside-outside air switching door 23 is driven by an electric actuator 62 for the inside-outside air switching door. The operation of the electric actuator 62 is controlled by a control signal output from the air-conditioning controller 50 (described below).

The blower 32 is disposed on the downstream side in the air flow of the inside-outside air switching device 20 inside the casing 31. The blower 32 is one that blows air sucked through the inside-outside air switching device 20 toward the inside of the vehicle compartment. The blower 32 is an electric blower in which a centrifugal multi-blade fan is driven by an electric motor. A rotational speed (that is, a blowing capacity) of the blower 32 is controlled by a control voltage output from the air-conditioning controller 50.

The evaporator 15 is disposed on the downstream side in the air flow of the blower 32. The evaporator 15 constitutes the refrigeration cycle device 10. The evaporator 15 is a cooling heat exchanger that performs heat exchange between a low-pressure refrigerant and air blown from the blower 32 to evaporate the low-pressure refrigerant so that the refrigerant exhibits a heat absorbing action to cool the blown air in the refrigeration cycle device 10.

The refrigeration cycle device 10 will be described. As illustrated in FIG. 1, the refrigeration cycle device 10 includes a compressor 11, a condenser 12, a receiver 13, an expansion valve 14, and the evaporator 15 which are annularly connected through a refrigerant pipe.

The compressor 11 sucks a refrigerant in the refrigeration cycle device 10, and compresses and discharges the refrigerant. The compressor 11 is disposed inside an engine room. The compressor 11 is an electric compressor in which a fixed capacity type compression mechanism 11a whose discharge capacity is fixed is driven by an electric motor 11b. The electric motor 11b is an alternating-current motor whose rotation speed is controlled by an alternating-current voltage output from an inverter 61.

The inverter 61 outputs an alternating-current voltage having a frequency corresponding to a control signal output from the air-conditioning controller 50. Accordingly, the rotation speed of the electric motor 11b is controlled, so that a refrigerant discharge capacity of the compressor 11 is adjusted.

A refrigerant inlet side of the condenser 12 is connected to a discharge port of the compressor 11. The condenser 12 is disposed on the vehicle front side inside the engine room. The condenser 12 is a radiation heat exchanger that performs heat exchange between a high-pressure refrigerant and outside air blown from a blowing fan 12a to condense the high-pressure refrigerant by heat radiation. The blowing fan 12a is an electric blower whose rotation speed (that is, a blowing capacity) is controlled by a control voltage output from the air-conditioning controller 50.

An inlet side of the receiver 13 is connected to a refrigerant outlet of the condenser 12. The receiver 13 is a gas-liquid separator that separates gas and liquid of the refrigerant condensed by the condenser 12 to store a surplus refrigerant of the cycle and feeds the separated liquid-phase refrigerant to the downstream side.

An inlet side of the expansion valve 14 is connected to a liquid-phase refrigerant outlet of the receiver 13. The expansion valve 14 is disposed inside the engine room. The expansion valve 14 is a pressure reducing device that pressure-reduces and expands the liquid-phase refrigerant flowing out of the receiver 13. In the present embodiment, a temperature expansion valve that adjusts a refrigerant flow rate so that the degree of superheat in the refrigerant on the outlet side of the evaporator 15 approaches a predetermined reference superheat degree is employed as the expansion valve 14.

A refrigerant inlet side of the evaporator 15 is connected to an outlet port of the expansion valve 14. A refrigerant suction port side of the compressor 11 is connected to a refrigerant outlet of the evaporator 15. This constitutes a vapor compression refrigeration cycle in which the refrigerant circulates through the discharge port of the compressor 11, the condenser 12, the receiver 13, the expansion valve 14, the evaporator 15, and the suction port of the compressor 11 in this order. The blown air can be cooled by the evaporator 15. Therefore, the refrigeration cycle device 10 of the present embodiment is a cooling device for cooling the blown air.

A cool air heating passage 33 and a cool air bypass passage 34 are formed on the downstream side in the air flow of the evaporator 15 in the casing 31. The cool air heating passage 33 and the cool air bypass passage 34 are formed in parallel to each other with respect to the blown air flow. Further, a mixing space 35 is formed on the downstream side in the blown air flow of the cool air heating passage 33 and the cool air bypass passage 34. In the mixing space 35, blown air flowing out of the cool air heating passage 33 and blown air flowing out of the cool air bypass passage 34 are mixed.

In the cool air heating passage 33, the heater core 36 and the PTC heater 37 for heating air that has passed through the evaporator 15 are disposed in this order in the flow direction of blown air. The heater core 36 is a heating heat exchanger that performs heat exchange between an engine coolant (hereinbelow, merely referred to as the coolant) that cools the engine EG and blown air flowing into the cool air heating passage 33 to heat the blown air.

The heater core 36 and the engine EG are connected through a coolant pipe 41. Thus, a coolant circuit 40 for circulating the coolant is formed between the heater core 36 and the engine EG.

Further, a coolant pump 40a for pumping the coolant to the heater core 36 is disposed in the coolant circuit 40. The coolant pump 40a is an electric water pump whose rotation speed (that is, a pressure-feeding capacity) is controlled by a control voltage output from the air-conditioning controller 50. The coolant pump 40a functions as a flow rate adjusting device for adjusting the flow rate of the coolant flowing into the heater core 36.

The PTC heater 37 is an electric heater that includes a PTC element (that is, a positive temperature coefficient thermistor). The PTC heater 37 is an auxiliary heating device that generates heat by the supply of power to the PTC element from the air-conditioning controller 50 to heat air that has passed through the heater core 36. The PTC heater 37 includes a plurality of PTC elements (three PTC elements in the present embodiment). Thus, the heating capacity of the entire PTC heater 37 can be changed by changing the number of PTC elements to which power is supplied by the air-conditioning controller 50.

The cool air bypass passage 34 is an air passage for guiding air that has passed through the evaporator 15 to the mixing space 35 without allowing the air to pass through the heater core 36 and the PTC heater 37. Thus, the temperature of blown air mixed in the mixing space 35 can be changed by changing an air volume ratio between the volume of blown air flowing through the cool air heating passage 33 and the volume of blown air flowing through the cool air bypass passage 34.

Thus, in the present embodiment, the air mix door 39 is disposed inside the air passage as a blown air temperature regulation unit that changes the air volume ratio to regulate the temperature of the blown air mixed in the mixing space 35.

The air mix door 39 is disposed on the downstream side in the air flow of the evaporator 15 and on the inlet side of the cool air heating passage 33 and the cool air bypass passage 34. The air mix door 39 continuously changes the open area of an inlet port of the cool air heating passage 33 and the open area of an inlet port of the cool air bypass passage 34.

Thus, the temperature of the blown air mixed in the mixing space 35 can be regulated by changing the degree of opening of the air mix door 39. The air mix door 39 is driven by an electric actuator 63 for the air mix door. The operation of the electric actuator 63 is controlled by a control signal output from the air-conditioning controller 50.

A plurality of open holes are formed on the most downstream part in the blown air flow of the casing 31. The open holes are holes for allowing the temperature-regulated blown air to flow out of the mixing space 35 into the inside of the vehicle compartment. In the present embodiment, the open holes include a defogger open hole 26, face open holes 24a, 24b, foot open holes 25a, 25b, and a rear open hole 27.

The face open hole 24 is an open hole for blowing air-conditioning air toward the upper body of an occupant seated on the front seat. The foot open hole 25 is an open hole for blowing air-conditioning air toward the feet of an occupant seated on the front seat. The defogger open hole 26 is an open hole for blowing air-conditioning air toward the inner side face of a vehicle front window glass W. The open holes 24 to 26 are connected to dedicated blowing ports (not illustrated) disposed inside the vehicle compartment through ducts each of which forms an air passage.

On the air flow upstream side of the face opening hole 24, the foot opening hole 25 and the defogger opening hole 26, blowing port mode doors 24a to 26a for adjusting the opening area of each opening hole are arranged. The blowing port mode doors 24a to 26a are blowing port mode switchers that adjust the open areas of the respective open holes.

More specifically, in the blowing port mode doors 24a to 26a, the face door 24a adjusts the open area of the face open hole 24. The foot door 25a adjusts the open area of the foot open hole 25. The defogger door 26a adjusts the open area of the defogger open hole 26.

The blowing port mode doors 24a to 26a are coupled to a link mechanism (not illustrated) and driven in a ganged manner by an electric actuator 64 for the blowing port mode doors. The operation of the electric actuator 64 is controlled by a control signal output from the air-conditioning controller 50.

The blowing port mode switched by the blowing port mode doors 24a to 26a includes a face mode, a bilevel mode, a foot mode, a foot defogger mode, and a defogger mode.

In the face mode, the face open hole 24 is fully open so that air-conditioning air is blown toward the upper body of an occupant through the face open hole 24. In the bi-level mode, both of the face open hole 24 and the foot open hole 25 are open so that air-conditioning air is blown toward both of the upper body and the feet of an occupant. In the foot mode, the foot open hole 25 is fully open and the defogger open hole 26 is open by a small opening degree so that air-conditioning air is blown mainly through the foot open hole 25. In the foot defogger mode, the foot open hole 25 and the defogger open hole 26 are open by the same degree so that air-conditioning air is blown through both of the foot open hole 25 and the defogger open hole 26. In the defogger mode, the defogger open hole 26 is fully open so that air is blown toward the inner face of the vehicle front window glass W through the defogger open hole 26.

Figure 2:
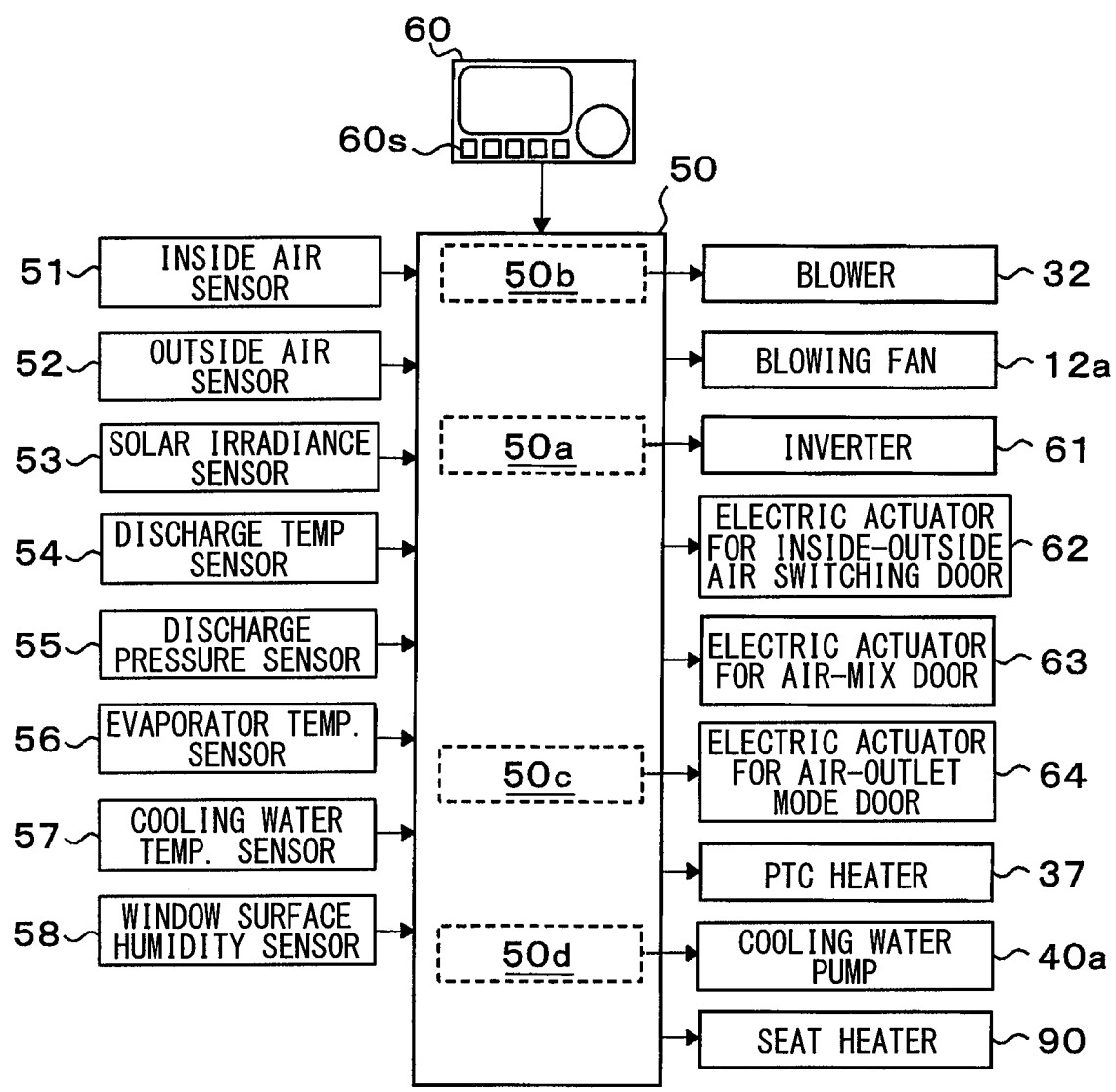
FIG. 2 is a block diagram illustrating an electric control unit of the vehicular air-conditioning device of the embodiment.

Furthermore, as shown in FIG. 2, the vehicular air conditioning device 1 of the present embodiment is provided with a seat heater 90.

The seat heater 90 is an electric heater that is disposed in a seat on which an occupant is seated and generates heat by being supplied with electric power to heat the seat. Therefore, the seat heater 90 is an auxiliary heating device which gives a feeling of heating for occupants by raising the surface temperature of the seat. The operation of the seat heater 90 is controlled by electric power supplied from the air-conditioning controller 50.

Next, an outline of an electric control unit of the present embodiment will be described with reference to FIG. 2. The air-conditioning controller 50 shown in FIG. 2 includes a known microcomputer including CPU, ROM, RAM and the like, and peripheral circuits. The air-conditioning controller 40 is an air-conditioning control unit which performs various calculations and processes based on control programs stored in the ROM, and controls actuations of the various control target devices connected to the output side.

The blower 32, the inverter 61 for the electric motor 11b of the compressor 11, the blowing fan 12a, the various electric actuators 62, 63, 64, the PTC heater 37, and the coolant pump 40a are connected to the output side of the air-conditioning controller 50.

The input side of the air conditioning controller 50 is connected to a sensor group of various sensors for air-conditioning control including an inside air sensor 51, an outside air sensor 52, a solar radiation sensor 53, a discharge temperature sensor 54, a discharge pressure sensor 55, an evaporator temperature sensor 56, a coolant temperature sensor 57, and a window surface humidity sensor 58.

The inside air sensor 51 is an inside air temperature detection unit that detects a vehicle-compartment interior temperature (that is, an inside air temperature) Tr. The outside air sensor 52 is an outside air temperature detection unit that detects a vehicle-compartment exterior temperature (i.e. an outside air temperature) Tam. The solar radiation sensor 53 is a solar radiation amount detection unit that detects a solar radiation amount Ts inside the vehicle compartment. The discharge temperature sensor 54 is a discharge temperature detection unit that detects a temperature Td of a refrigerant discharged from the compressor 11. The discharge pressure sensor 55 is a discharge pressure detection unit that detects a pressure Pd of a refrigerant discharged from the compressor 11. The evaporator temperature sensor 56 is an evaporator temperature detection unit that detects a blown air temperature TE of air blown from the evaporator 15 (substantially, the evaporator temperature). The coolant temperature sensor 57 is a coolant temperature detection unit that detects a coolant temperature TW of a coolant flowing out of the engine EG. The window surface humidity sensor 58 is a humidity detection unit that detects a near-window humidity RH which is the humidity of air inside the vehicle compartment near the window glass.

Specifically, the evaporator temperature sensor 56 of the present embodiment detects the temperature of a heat exchange fin of the evaporator 15. Of course, a temperature detection unit that detects the temperature of another part of the evaporator 15 or a temperature detection unit that detects the temperature of a refrigerant itself flowing through the evaporator 15 may be employed as the evaporator temperature sensor 56.

Furthermore, on the input side of the air-conditioning control device 50, an operation panel 60 located near the instrument panel in the front part of the vehicle compartment is connected. Operation signals of various switches which are disposed on the operation panel 60 are input to the air-conditioning controller 50.

Specifically, the operation switches disposed on the operation panel 60 include an air-conditioning switch, an automation switch, a suction port mode selector switch, the blowing port mode selector switch, an air volume setting switch, a temperature setting switch, and a seat heater switch 60s.

The air-conditioning switch is a compressor operation setting unit that performs switching between operation and stop of the compressor 11 by an operation of an occupant. The automation switch is an automatic control setting unit that sets or cancels automatic control of the vehicular air-conditioning device 1 by an operation of an occupant. The suction port mode selector switch is a suction port mode setting unit that switches the suction port mode by an operation of an occupant. The blowing port mode selector switch is a blowing port mode setting unit that switches the blowing port mode by an operation of an occupant. The air volume setting switch is an air volume setting unit for manually setting a blowing volume of the blower 32. The temperature setting switch is a target temperature setting unit that sets a vehicle-compartment interior target temperature Tset by an operation of an occupant. The seat heater switch 60s is a heater setting unit that performs switching between operation and stop of the seat heater 90 by an operation of an occupant.

Here, the air-conditioning control device 50 of the present embodiment integrally includes a control unit that controls the operation of various control target devices connected to its output side. In the air-conditioning controller 50, configurations (hardware and software) that control the operation of each of the control target devices constitute a control unit of the control target devices.

For example, in the present embodiment, the configuration for controlling the refrigerant discharge capacity of the compressor 11 constitutes the discharge capacity control unit 50a. Further, a configuration for controlling the operation of the blower 32 to control the blowing capability of the blower 32 constitutes the blower control unit 50b. A configuration for controlling the operation of the electric actuator 64 that drives the blowing mode doors 24a to 26a constitutes the blowing mode control unit 50c. Further, a configuration for controlling the operation of the cooling water pump 40a to adjust the flow rate of the cooling water flowing into the heater core 36 constitutes the flow rate adjustment control unit 50d.

Here, since the discharge capacity controller 50a controls the refrigerant discharge capacity of the compressor 11, it controls the cooling capacity of the refrigeration cycle device 10. That is, the discharge capacity control unit 50a is the cooling capacity control unit of the refrigeration cycle device 10. In addition, these control units may be constituted by separate control devices.

Next, the operation of the vehicular air-conditioning device 1 of the present embodiment in the above configuration will be described with reference to FIGS. 3 to 10. The flowcharts shown in FIGS. 3 to 10 show the air-conditioning control executed by the air-conditioning control device 50. Control steps illustrated in flowcharts of FIGS. 3 to 10 constitute various function implementation sections included in the air-conditioning control device 50.

Figure 3:
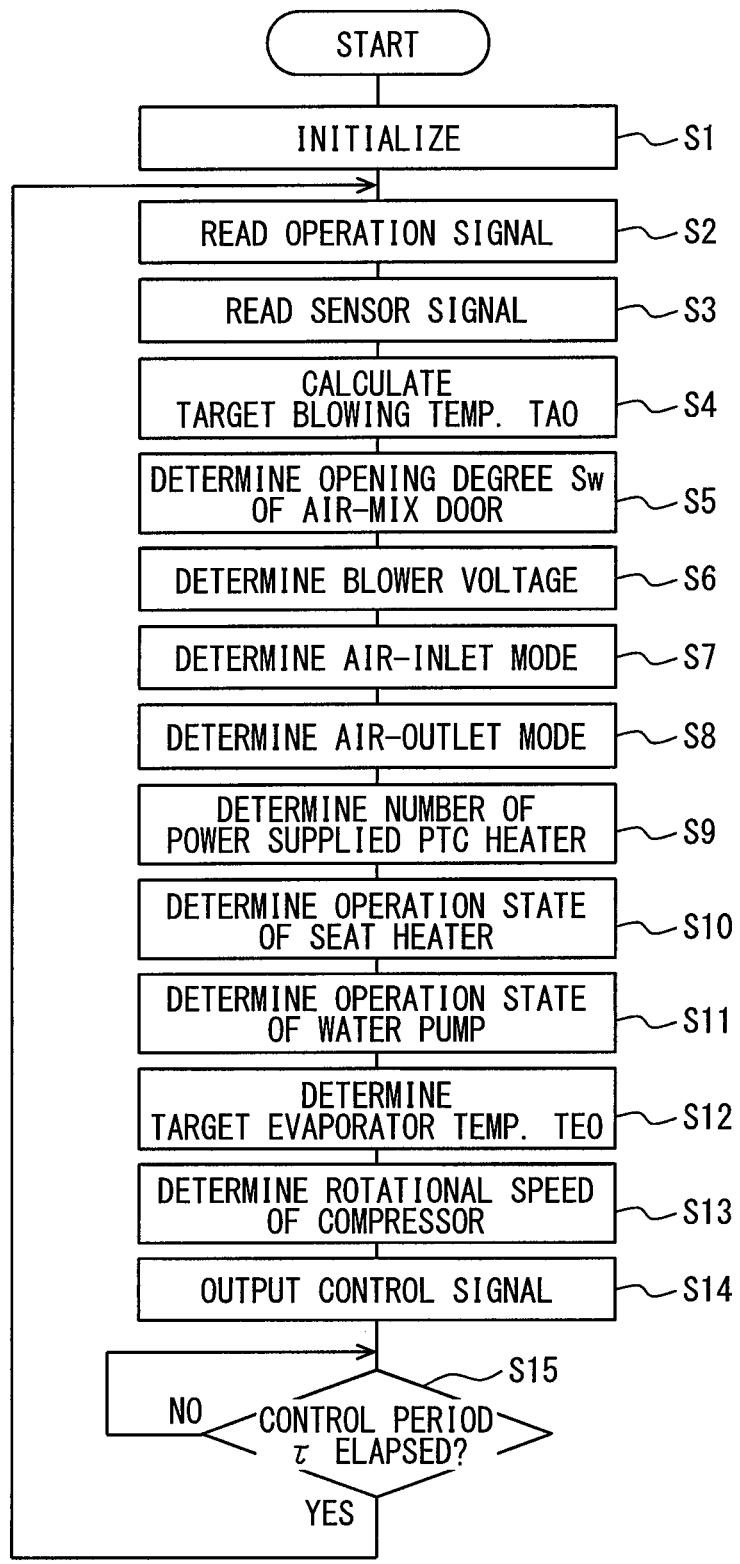
FIG. 3 is a flowchart illustrating a control process of an air-conditioning controller of the vehicular air-conditioning device of the embodiment.

A control process illustrated in the flowchart of FIG. 3 is executed as a main routine of the air-conditioning control. The control process is executed when the automation switch of the operation panel 60 is turned on in a condition where an activation switch (that is, IG switch) of the vehicle system is turned on. The vehicle system is not limited to the engine EG, an engine control device or the like, but refers to the entire control target system mounted on the vehicle including the vehicular air-conditioning device 1.

First, in step S1, initialization of a flag and a timer and initialization of initial alignment of a stepping motor which constitutes the above electric actuator are performed. In step S1, not all flags and calculation values are initialized. For example, values stored at the previous operation end of the vehicular air-conditioning device 1 are maintained for some flags and calculation values.

Next, in step S2, an operation signal of the operation panel 60 is read in. Then, the process proceeds to step S3. In step S3, signals representing a vehicle environment state used in the air-conditioning control, that is, sensor signals detected by the sensor group of the sensors 51 to 58 described above are read in. Then, the process proceeds to step S4.

In step S4, a target blowing temperature TAO of air blown into the vehicle compartment at the front seat side is calculated. The target blowing temperature TAO is calculated by the following formula F1.

$$TAO = Kset \times Tset - Kr \times Tr - Kam \times Tam - Ks \times Ts + C \quad (F1)$$

Tset is a vehicle-compartment interior set temperature set by the temperature setting switch. Tr is an inside air temperature detected by the inside air sensor 51. Tam is an outside air temperature detected by the outside air sensor 52. Ts is a solar radiation amount detected by the solar radiation sensor 53. Kset, Kr, Kam, and Ks are control gains, and C is a constant for correction.

The target blowing temperature TAO is a value correlated to the amount of heat that needs to be generated by the vehicular air-conditioning device 1 for maintaining the inside of the vehicle compartment at a desired temperature. Thus, the target blowing temperature TAO can be used as an index that indicates an air-conditioning load (in other words, an air-conditioning heat load) required of the vehicular air-conditioning device 1.

In the following steps S4 to S13, a control state of each of the various devices connected to the air-conditioning controller 50 is determined.

First, in step S4, a target opening degree SW of the air mix door 39 is determined. Specifically, in step S5, a provisional air mix opening degree SWdd is calculated by the following formula F2.

$$SWdd = \{TAO - (TE+2)\} / \{MAX(10, TW-(TE+2))\} \times 100 \ (\%) \quad (F2)$$

TE is a blown air temperature detected by the evaporator temperature sensor 56. TW is a coolant temperature detected by the coolant temperature sensor 57. In formula F2, {MAX (10, TW−(TE+2))} represents a value of the larger one of 10 and TW−(TE+2).

Then, the air mix opening degree SW is determined on the basis of the provisional air mix opening degree SWdd calculated by formula F2 with reference to a control map which is previously stored in the air-conditioning controller 50. In the control map, the air mix opening degree SW corresponding to the provisional air mix opening degree SWdd is nonlinearly determined.

This is because of the following reason. In the present embodiment, a cantilever door is employed as the air mix door 39. Thus, the open area of the inlet port of the cool air heating passage 33 and the open area of the inlet port of the cool air bypass passage 34 nonlinearly change in response to changes in the air mix opening degree SW.

When SW=0%, the air mix door 39 is displaced to a maximum cooling position. That is, the air mix door 39 is displaced to a position where the cool air bypass passage 34 is fully open and the cool air heating passage 33 is fully closed. When SW=100%, the air mix door 39 is displaced to a maximum heating position. That is, the air mix door 39 is displaced to a position where the cool air bypass passage 34 is fully closed and the cool air heating passage 33 is fully open.

Next, in step S6, a blowing capacity of the blower 32 is determined. More specifically, in step S6, a blower voltage applied to the electric motor of the blower 32 is determined. The details of step S6 will be described with reference to the flowchart of FIGS. 4, 5.

First, in step S61, it is determined whether the automation switch of the operation panel 60 is on. When it is determined that the automation switch is not on in step S61, the process proceeds to step S62. In step S62, a blower voltage that achieves an air volume desired by an occupant, the air volume being set by using the air volume setting switch of the operation panel 60, is determined. Then, the process proceeds to step S7.

On the other hand, when it is determined that the automation switch is on in step S61, the process proceeds to step S63. In step S63, a subroutine for determining a first provisional blower voltage f(time) is executed. f(time) is a provisional blower voltage determined according to the elapsed time since the activation switch (hereinafter referred to as IG switch) of the vehicle system is turned on. The detail of this subroutine will be described with reference to FIG. 5.

First, in step S631, it is determined whether the seat heater 90 is in operation based on the operation signal of the seat heater switch 60s of the operation panel 60. When it is determined in step S631 that the seat heater 90 is not in operation, the process proceeds to step S632 in which f(time) is determined to be 12 (V), and the process returns to the main routine.

On the other hand, when it is determined that the seat heater is in operation in step S631, the process proceeds to step S633. In step S633, f(humidity near window) is determined on the basis of the near-window humidity RH detected by the window surface humidity sensor 58 with reference to a control map which is previously stored in the air-conditioning controller 50. f(humidity near window) is a parameter α used for determining a waiting time WTm described later.

Figure 5:
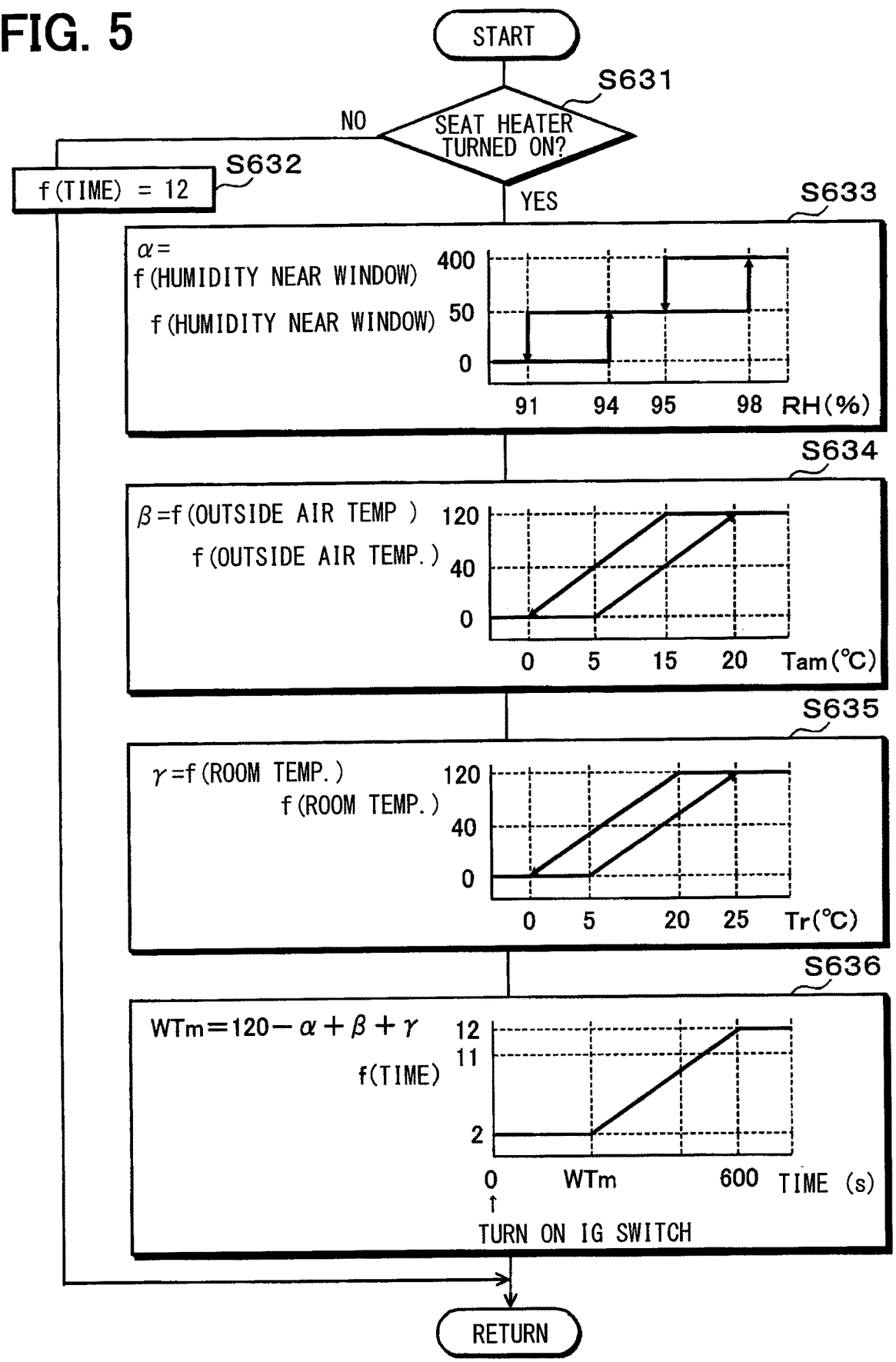
FIG. 5 is a flowchart illustrating a subroutine of a control process for determining a blower voltage in the control process of the air-conditioning controller of the embodiment.

In the control map, as shown in a control characteristic diagram described in step S633 of FIG. 5, the humidity correction factor f(humidity near window) is determined so as to increase with increase of the near-window humidity RH in step by step manner. In the control characteristic diagram illustrated in step S633, a hysteresis width for preventing control hunting is set.

In step S634, the f(outside air temperature) is determined on the basis of the outside air temperature Tam with reference to a control map which is previously stored in the air-conditioning controller 50. f(outside air temperature) is a parameter 3 used for determining a waiting time WTm. In step S634, it is desirable to store and use the outside air temperature Tam when the IG switch is turned on, that is, the outside air temperature Tam when the vehicle system is activated.

In the control map, as shown in a control characteristic diagram described in step S634 of FIG. 5, the f(outside air temperature) is determined to increase with increase of the outside air temperature Tam while the outside air temperature Tam is in a predetermined range. In the control characteristic diagram illustrated in step S634, a hysteresis width for preventing control hunting is set.

In next step S635, the f(room temperature) is determined on the basis of the inside air temperature Tr with reference to a control map which is previously stored in the air-conditioning controller 50. f(room temperature) is a parameter γ used for determining a waiting time WTm. In step S635, it is desirable to store and use the inside air temperature Tr when the IG switch is turned on, that is, the inside air temperature Tr when the vehicle system is activated.

In the control map, as shown in a control characteristic diagram described in step S635 of FIG. 5, the f(room temperature) is determined to increase with increase of the inside air temperature Tr while the inside air temperature Tr is in a predetermined range. In the control characteristic diagram illustrated in step S635, a hysteresis width for preventing control hunting is set.

In next step S636, the waiting time WTm is calculated by using the following formula F3. Further, f(time) is determined on the basis of the calculated waiting time WTm with referring to the control map previously stored in the air-conditioning controller 50, and the process returns to the main routine.

$$WTm = 120 - \alpha + \beta + \gamma \tag{F3}$$

Here, the waiting time WTm is a time to prohibit an increase of the air blowing capability of the blower 32 after the IG switch is turned on.

For this reason, in this control map, as shown in the control characteristic diagram described in step S636 of FIG. 5, f(time) is determined such that the minimum operating voltage at which the blower 32 operates is at Vmin (specifically, 2 V) until the waiting time WTm has elapsed since the IG switch has been turned on. Further, after the waiting time WTm elapsed, f(time) is determined to increase with the lapse of time.

In other words, in this control map, the first provisional blower voltage f(time) is determined so as not to increase the blowing capacity of the blower 32 until the waiting time WTm elapses after the IG switch is turned on. Furthermore, after the standby time WTm elapsed, the first provisional blower voltage f(time) is determined so as to increase the blowing capacity of the blower 32 with the lapse of time.

Further, α in formula F3 is f(humidity near window) determined in Step S633. Therefore, in this embodiment, the waiting time WTm is decreased with increase of the near-window humidity RH by increasing α.

Further, β in formula F3 is f(outside air temperature) determined in Step S634. Therefore, in this embodiment, the waiting time WTm is increased with increase of the outside air temperature Tam by increasing β.

Further, γ in formula F3 is f(room temperature) determined in Step S635. Therefore, in this embodiment, the waiting time WTm is increased with increase of the inside air temperature Tr by increasing γ.

Figure 4:
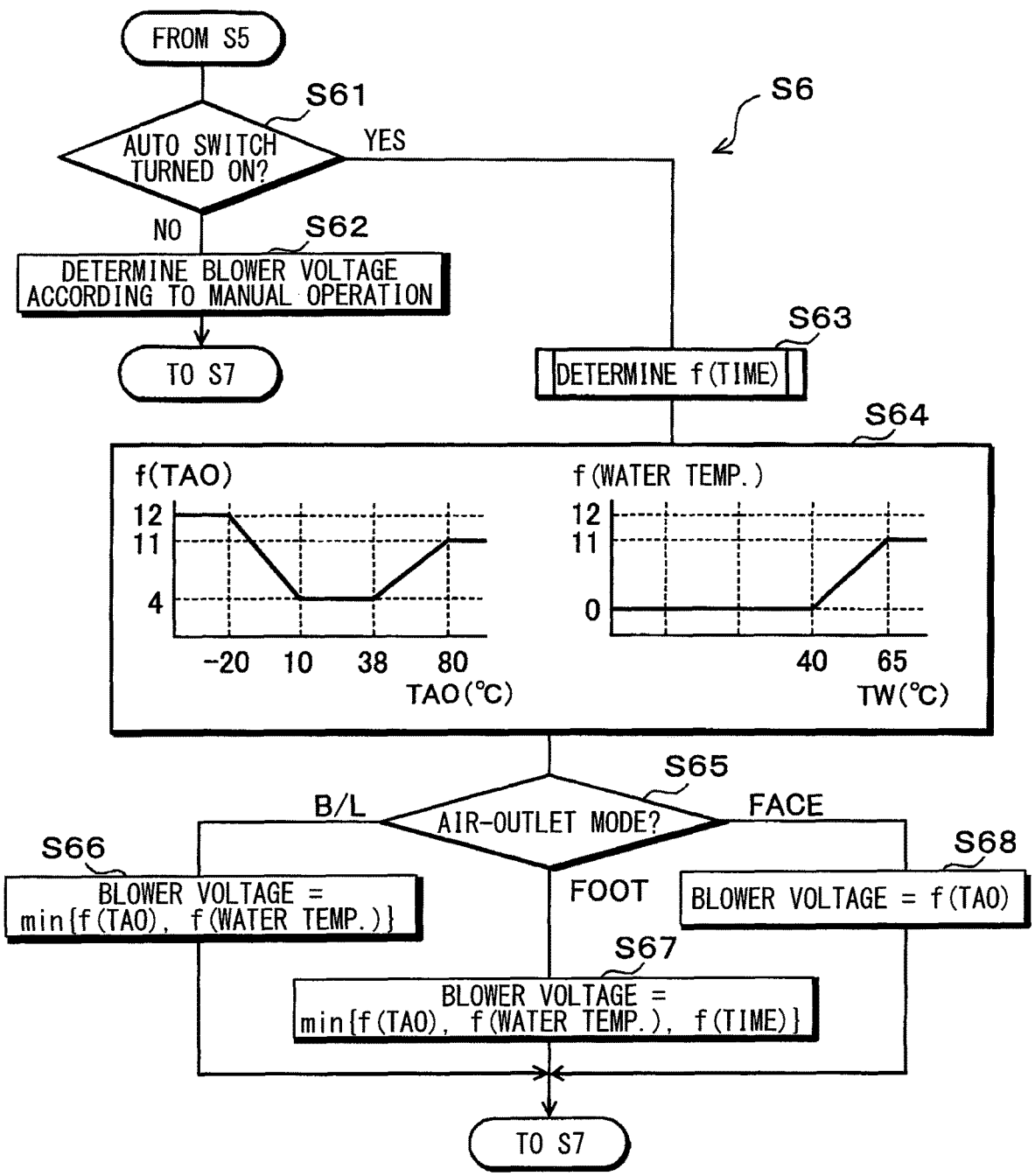
FIG. 4 is a flowchart illustrating a control process for determining a blower voltage in the control process of the air-conditioning controller of the embodiment.

Next, in step S64 of FIG. 4, the second provisional blower voltage f(TAO) and the third provisional blower voltage (water temperature) are determined. The second blower voltage f(TAO) is determined on the basis of the target blowing temperature TAO with reference to a control map which is previously stored in the air-conditioning controller 50.

In the control map, as shown in a control characteristic diagram described in step S64 of FIG. 4, the second blower voltage f(TAO) is raised in an extremely low temperature range (maximum cooling range) and an extremely high temperature range (maximum heating range) of the TAO to increase the air volume of the blower 32. When the TAO falls into an intermediate temperature range, the second blower voltage f(TAO) is lowered to reduce the air volume of the blower 32.

That is, the second blower voltage f(TAO) is determined so as to increase the blowing capacity of the blower 32 when a high cooling capacity or a high heating capacity is required of the vehicular air-conditioning device 1.

The third provisional blower voltage f(water temperature) is determined on the basis of the coolant temperature TW with reference to a control map which is previously stored in the air-conditioning controller 50.

In the control map, as shown in a control characteristic diagram described in step S64 of FIG. 4, when the coolant temperature TW is equal to or lower than a relatively low first reference coolant temperature (40 degrees Celsius in the present embodiment), the third blower voltage f(water temperature) is set to 0. Further, the third blower voltage f(water temperature) is raised with a rise in the coolant temperature TW from the first reference coolant temperature to a second reference coolant temperature (65 degrees Celsius in the present embodiment).

That is, the third provisional blower voltage f(water temperature) is determined so as to increase the air volume blown by the blower 32 with increase of the temperature of the cooling water.

In step S65, it is determined whether the blowing port mode determined in step S83 of FIG. 7 (described below) is any of the foot mode (described as FOOT in FIG. 4), the bilevel mode (described as B/L in FIG. 4), and the face mode (described as FACE in FIG. 4).

When it is determined in step S65 that the blowing port mode is the bilevel mode, the process proceeds to step S66. In step S66, smaller one of the second provisional blower voltage f(TAO) and the third provisional blower voltage (water temperature) is determined as the blower voltage, and the process proceeds to step S7.

When it is determined in step S65 that the blowing port mode is the foot mode, the process proceeds to step S67. In step S67, the smallest one of the second provisional blower voltage f(TAO), the third provisional blower voltage (water temperature), and the first provisional blower voltage f(time) is determined as the blower voltage, and the process proceeds to step S7.

When it is determined in step S66 that the blowing port mode is the face mode, the process proceeds to step S68. In step S68, the blower voltage is set to the second provisional blower voltage f(TAO). Then, the process proceeds to step S7.

Next, in step S7, the suction port mode is determined. More specifically, a control signal output to the electric actuator 62 for the inside-outside air switching door is determined. The details of step S7 will be described with reference to the flowchart of FIG. 6.

First, in step S71, it is determined whether the automation switch of the operation panel 60 is on. When it is determined that the automation switch of the operation panel 60 is not on in step S71, the process proceeds to step S72. In step S72, it is determined whether outside air introduction (described as FRS in FIG. 6) is set by the suction port mode selector switch of the operation panel 60.

When it is determined that the outside air introduction is set in step S72, the process proceeds to step S73. In step S73, an outside air rate is set to 100% (that is, the all-outside air mode), and the process proceeds to step S8. When it is determined that the outside air introduction is not set in step S72, the process proceeds to step S74. In step S74, the outside air rate is set to 0% (that is, the all-inside air mode), and the process proceeds to step S8.

The outside air rate is the proportion of outside air in blown air introduced into the inside-outside air switching device 20. Thus, the outside air rate can also be referred to as an outside air introduction rate.

On the other hand, when it is determined that the automation switch of the operation panel 60 is on in step S71, the process proceeds to step S75. In step S75, it is determined which operation, a cooling operation or a heating operation, is being performed on the basis of the target blowing temperature TAO.

Specifically, in the present embodiment, when the target blowing temperature TAO is higher than 25 degrees Celsius, it is determined that the heating operation is being performed, and the process proceeds to step S76. In step S76, the outside air rate is determined on the basis of the near-window humidity RH with reference to a control map which is previously stored in the air-conditioning controller 50. Then, the process proceeds to step S8.

Figure 6:
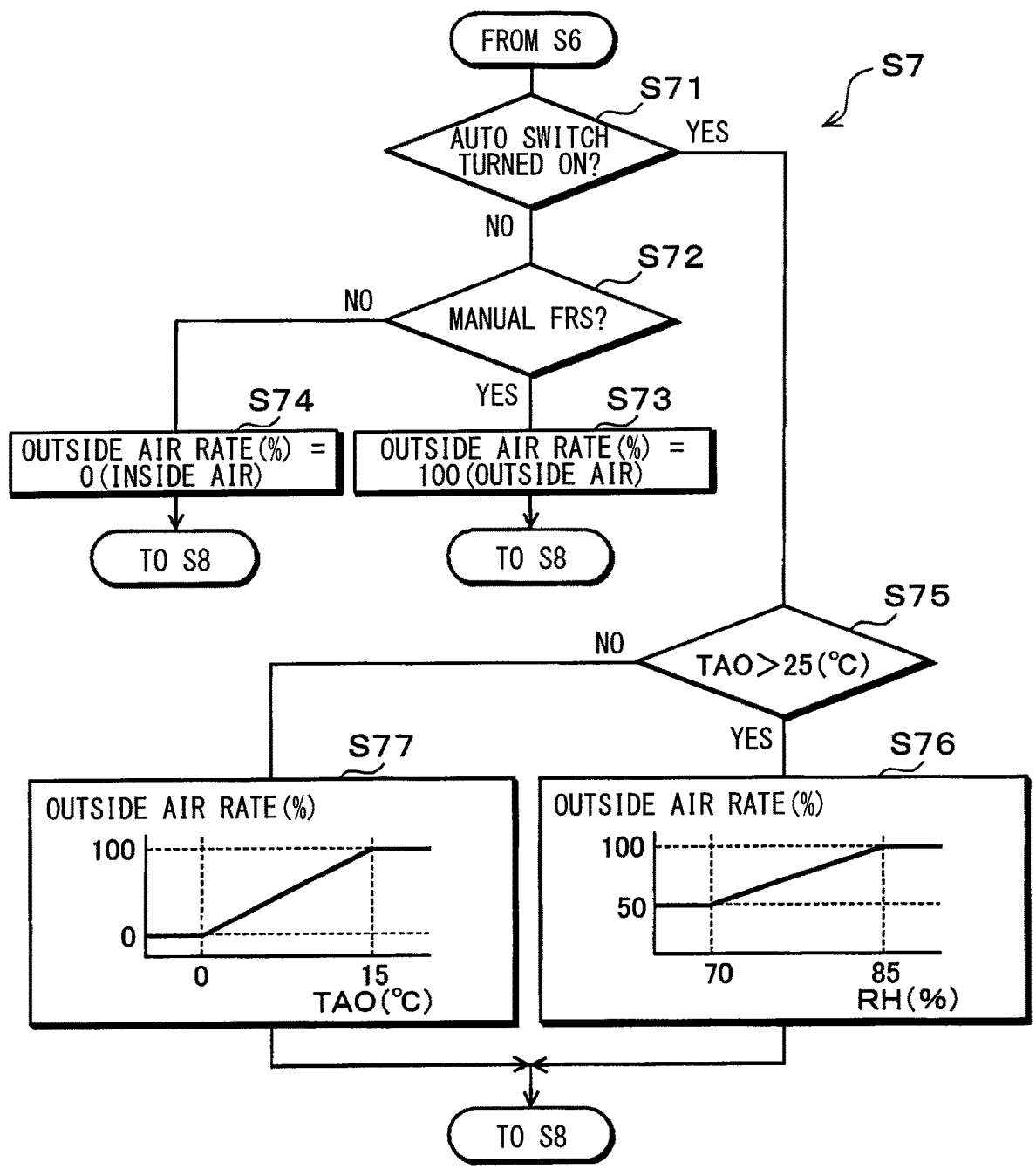
FIG. 6 is a flowchart illustrating a control process for determining a suction port mode in the control process of the air-conditioning controller of the embodiment.

In the control map, as shown in a control characteristic diagram described in step S76 of FIG. 6, the outside air rate is increased with a rise in the near-window humidity RH. More specifically, in the present embodiment, the outside air rate is set to 50% when RH≤70% and set to 100% when RH≥85%. In the range of 50%<RH<85%, the outside air rate is increased with a rise in the near-window humidity RH.

Accordingly, as the near-window humidity increases, the introduction rate of outside air is increased to reduce the humidity in the vehicle compartment interior space to prevent window fogging.

When the TAO is equal to or lower than 25 degrees Celsius in step S75, it is determined that the cooling operation is being performed, and the process proceeds to step S77. In step S77, the outside air rate is determined on the basis of the target blowing temperature TAO with reference to a control map which is previously stored in the air-conditioning controller 50. Then, the process proceeds to step S8.

In the control map, as shown in a control characteristic diagram described in step S77 of FIG. 6, the outside air rate is increased with a rise in the target blowing temperature TAO. More specifically, in the present embodiment, the outside air rate is set to 0% when TAO≤0 degrees Celsius and set to 100% when TAO≥15 degrees Celsius. In the range of 0 degree Celsius<TAO<15 degrees Celsius, the outside air rate is increased with a rise in the target blowing temperature TAO.

Accordingly, as the target blowing temperature TAO decreases (that is, as the cooling load increases), the introduction rate of inside air is increased to improve the cooling efficiency.

Next, in step S8, the blowing port mode is determined. More specifically, a control signal output to the electric actuator 64 for the blowing port mode doors is determined. The details of step S8 will be described with reference to the flowchart of FIG. 7.

First, in step S81, it is determined whether the automation switch of the operation panel 60 is on. When it is determined that the automation switch is not on, the process proceeds to step S82. In step S82, the blowing port mode is determined to a blowing port mode set by using the blowing port mode selector switch of the operation panel 60. Then, the process proceeds to step S9.

On the other hand, when it is determined that the automation switch of the operation panel 60 is on in step S81, the process proceeds to step S83. In step S83, a provisional blowing port mode is determined on the basis of the target blowing temperature TAO with reference to a control map which is previously stored in the air-conditioning controller 50.

Figure 7:
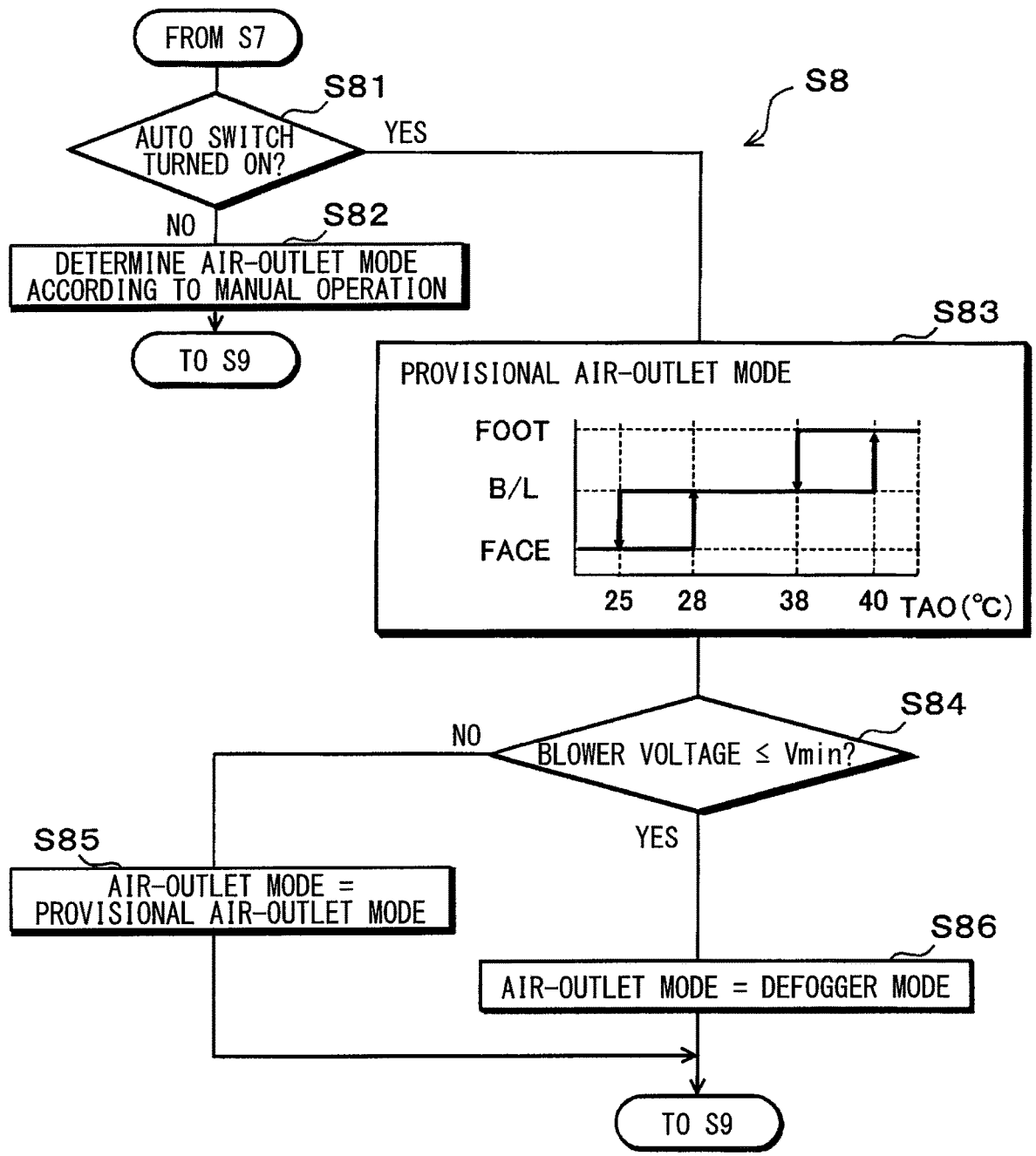
FIG. 7 is a flowchart illustrating a control process for determining a blowing port mode in the control process of the air-conditioning controller of the embodiment.

In the control map, as shown in a control characteristic diagram described in step S83 of FIG. 7, the provisional blowing port mode is sequentially switched to the face mode (described as FACE in FIG. 7), the bi-level mode (described as B/L in FIG. 7), and the foot mode (described as FOOT in FIG. 7) in this order with a rise in the TAO from the low temperature range to the high temperature range.

Thus, the face mode, the bi-level mode, and the foot mode are more likely to be mainly selected in summer, spring and autumn, and winter, respectively. In the control characteristic diagram illustrated in step S83, a hysteresis width for preventing control hunting is set.

In next step S84, it is determined whether the blower voltage determined in step S6 is equal to or lower than the minimum operation voltage Vmin (2 V in the present embodiment). When it is determined in step S84 that the blower voltage is not equal to or lower than the minimum operation voltage Vmin, the process proceeds to step S85. In step S85, the blowing port mode is determined to the provisional blowing port mode determined in step S83. Then, the process proceeds to step S9.

On the other hand, when it is determined in step S84 that the blower voltage is equal to or lower than the minimum operating voltage Vmin (2 V in the present embodiment) as in the case where the waiting time WTm has not elapsed since the IG switch was turned on, the process proceeds to step S86. In step S86, the blowing port mode is determined to the defogger mode. Then, the process proceeds to step S9.

Next, in step S9, a heating capacity of the PTC heater 37 is determined. More specifically, the number of PTC elements energized is determined. In step S9, the number of PTC elements energized is determined according to the outside air temperature Tam, the provisional air mix opening degree SWdd, and the coolant temperature TW.

In the present embodiment, when the outside air temperature Tam is equal to or lower than a reference outside air temperature (26 degrees Celsius in the present embodiment) and the provisional air mix opening degree SWdd is equal to or higher than a reference opening degree (100% in the present embodiment), the number of PTC elements energized is increased with a drop in the coolant temperature TW.

Accordingly, when the outside air temperature Tam is relatively low, and blown air thus cannot be sufficiently heated even when the air mix door 39 is displaced to the maximum heating position, the PTC heater 37 is operated as an auxiliary heating device for heating the blown air.

Next, in step S10, an operation state of the seat heater 90 is determined. In step S10, when the seat heater switch 60*s* of the operation panel 60 is turned on (ON), it is determined to supply power to the seat heater 90. On the other hand, when the seat heater switch 60s is turned off (OFF), it is decided to stop the supply of electric power to the seat heater 90.

Next, in step S11, it is determined whether to operate the coolant pump 40a of the coolant circuit 40. The details of step S11 will be described with reference to the flowchart of FIG. 8. First, in step S111, it is determined whether the coolant temperature TW is higher than the blown air temperature TE of air blown from the evaporator 15.

When the coolant temperature TW is equal to or lower than the blown air temperature TE in step S111, the process proceeds to step S114. In step S114, the coolant pump 40a is stopped. Then, the process proceeds to step S12. When the coolant with the coolant temperature TW equal to or lower than the blown air temperature TE flows to the heater core 36, the coolant flowing through the heater core 36 cools air that has passed through the evaporator 15, which reduces the temperature of air blown into the vehicle compartment on the contrary.

When the coolant temperature TW is higher than the blown air temperature TE in step S111, the process proceeds to step S112. In next step S112, it is determined whether the blower voltage determined in step S6 is higher than the minimum operation voltage Vmin. When it is determined in step S112 that the blower voltage is not higher than the minimum operating voltage Vmin as in the case where the waiting time WTm has not elapsed since the IG switch was turned on, the process proceeds to step S114. In step S114, stopping the coolant pump 40a is determined to save power.

When it is determined in step S112 that the blower voltage is higher than the minimum operation voltage Vmin, the process proceeds to step S113. In step S113, operating the coolant pump 40a is determined. Then, the process proceeds to step S12. Accordingly, the coolant pump 40a is operated, and the coolant circulates within the coolant circuit. Thus, it is possible to perform heat exchange between the coolant flowing through the heater core 36 and air passing through the heater core 36 to heat the blown air.

Next, in step S12, a target evaporator temperature TEO is determined. The target evaporator temperature TEO is a target value of a refrigerant evaporation temperature in the evaporator 15. The details of step S12 will be described with reference to the flowchart of FIG. 9.

First, in step S121, a first provisional target evaporator temperature TEO1 is determined on the basis of the target blowing temperature TAO with reference to a control map which is previously stored in the air-conditioning controller 50. In the control map, as shown in a control characteristic diagram described in step S121 of FIG. 9, the first provisional target evaporator temperature TEO1 is raised with a rise in the TAO.

In the following step S122, a second provisional target evaporator temperature TEO2 is determined on the basis of the near-window humidity RH with reference to a control map which is previously stored in the air-conditioning controller 50. In the control map, as shown in a control characteristic diagram described in step S122 of FIG. 9, the second provisional target evaporator temperature TEO2 is lowered with a rise in the RH.

In the following step S123, a value of the smaller one of the first provisional target evaporator temperature TEO1 and the second provisional target evaporator temperature TEO2 is determined as the target evaporator temperature TEO, and the process proceeds to step S13. Accordingly, dehumidification of blown air can be performed by lowering the target evaporator temperature TEO with a rise in the near-window humidity RH. Thus, it is possible to effectively reduce fogging of the vehicle window glass W.

Next, in step S13, the refrigerant discharge capacity of the compressor 11 is determined. More specifically, the rotation speed of the compressor 11 is determined. The determination of the compressor rotation speed in step S13 is performed not every control period τ in which the main routine of FIG. 3 is repeated, but every predetermined control interval (one second in the present embodiment).

Figure 10:
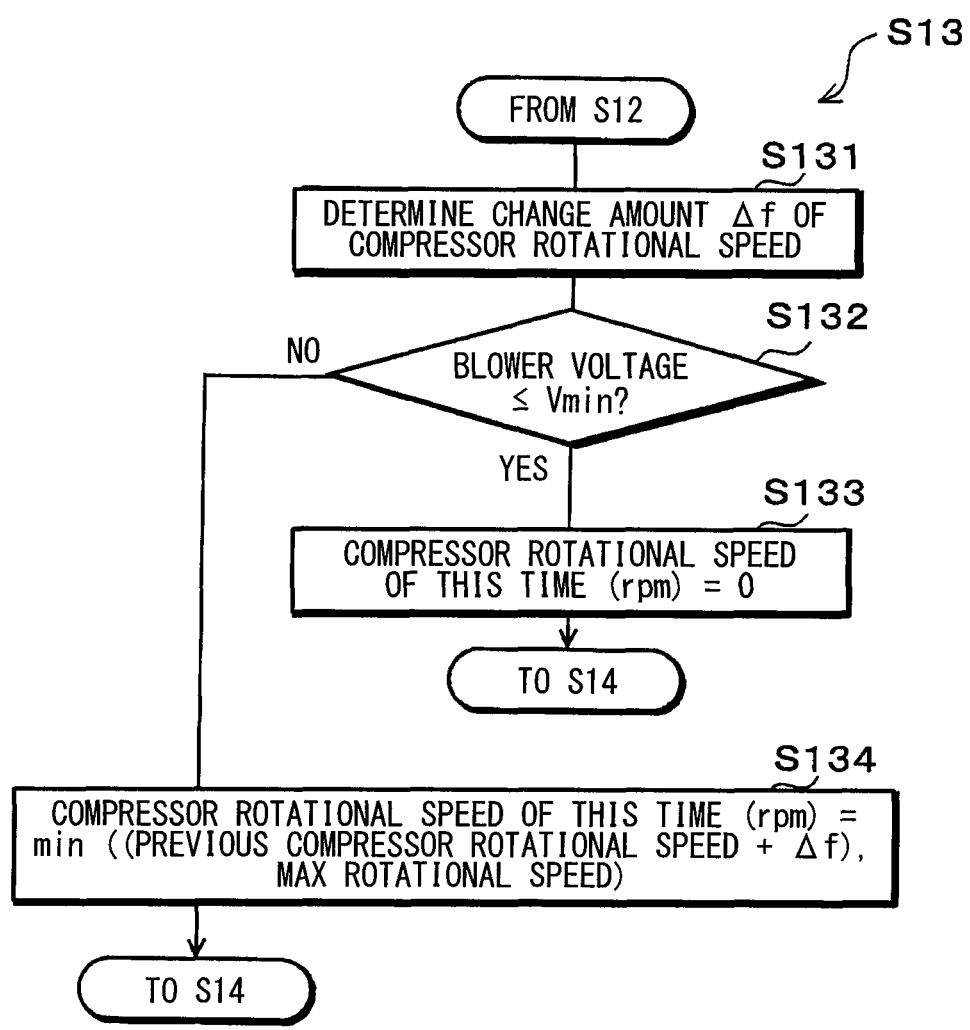
FIG. 10 is a flowchart illustrating a control process for determining a rotation speed of a compressor in the control process of the air-conditioning controller of the embodiment.

The details of step S13 will be described with reference to the flowchart of FIG. 10. First, in step S131, a rotation speed change amount Δf with respect to a previous compressor rotation speed fn−1 is obtained.

Specifically, a deviation En (TEO−TE) between the target blowing temperature TEO and the blown air temperature TE is calculated. Then, a deviation change rate Edot (En−(En−1)) is calculated by subtracting a deviation En−1 which is calculated last time from the deviation En which is calculated this time. Then, by using the deviation En and the deviation change rate Edot, the rotation speed change amount Δf with respect to the previous compressor rotation speed fn−1 is obtained on the basis of the fuzzy inference based on a membership function and a rule which are previously stored in the air-conditioning controller 50.

Next, in step S132, it is determined whether the blower voltage determined in step S6 is equal to or lower than the minimum operation voltage Vmin. When it is determined in step S132 that the blower voltage is equal to or lower than the minimum operating voltage Vmin as in the case where the waiting time WTm has not elapsed since the IG switch was turned on, the process proceeds to step S133. In step S133, the present compressor rotation speed is set to 0. That is, the compressor 11 is stopped.

When it is determined in step S132 that the blower voltage is not equal to or lower than the minimum operation voltage Vmin, the process proceeds to step S134. In step S134, the present compressor rotation speed is calculated by the following formula F4.

Present compressor rotation speed=MIN{(previous compressor rotation speed+Δf),MAX rotation speed} (F4)

In formula F4, "MIN {(previous compressor rotation speed+Δf), MAX rotation speed}" represents a value of the smaller one of "previous compressor rotation speed+Δf" and "MAX rotation speed". In the present embodiment, the MAX rotation speed is 10,000 rpm.

Next, in step S14, the air-conditioning controller 50 outputs a control signal and a control voltage to the various devices 12a, 32, 37, 40a, 61, 62, 63, 64, 90 so that the control state determined in steps S5 to S13 described above can be obtained.

Next, the process is kept on standby for the control period τ in step S15 and returns to step S2 when an elapse of the control period τ is determined. In the present embodiment, the control period τ is set to 250 ms. This is because a control period longer than that of engine control does not adversely affect the controllability of the air-conditioning control inside the vehicle compartment.

Accordingly, it is possible to reduce the amount of communication for the air-conditioning control inside the vehicle compartment to secure a sufficient communication amount for a control system that requires high-speed control such as engine control.

The vehicular air-conditioning device 1 of the present embodiment operates as described above, and accordingly the blown air blown by the blower 32 is cooled by the evaporator 15. Then, the cool air cooled in the evaporator 15 flows into the cool air heating passage 33 and the cool air bypass passage 34 according to the opening degree of the air mix door 39.

The cool air flowing into the cool air heating passage 33 is heated while passing through the heater core 36 and the PTC heater 37 and mixed with the cool air that has passed through the cool air bypass passage 34 in the mixing space 35. Then, the air-conditioning air whose temperature has been regulated in the mixing space 35 is blown into the vehicle compartment from the mixing space 35 through each of the blowing ports.

When air inside the vehicle compartment is cooled by the air-conditioning air blown into the vehicle compartment, cooling inside the vehicle compartment is realized. On the other hand, when the air inside the vehicle compartment is heated by the air-conditioning air, heating inside the vehicle compartment is realized.

Here, in the vehicular air conditioning device that heats blown air by using the cooling water of the engine EG as a heat source as in the vehicle air conditioning device 1 of the present embodiment, when the temperature of the cooling water does not increase, the blown air cannot be heated. Therefore, in the present embodiment, the third provisional blower voltage f(water temperature) is determined so that the blowing capacity of the blower 32 increases with increase of the cooling water temperature TW, as described in step S64 of FIG. 4.

However, when the blowing capacity of the blower 32 is increased with increase of the cooling water temperature TW at the time of starting the engine EG, the heat of the cooling water is likely to be dissipated by the heater core 36, and accordingly the cooling water temperature may be unlikely to increase. As a result, warming-up of the engine EG is delayed, and accordingly viscosity of the engine oil and the automatic transmission fluid (so-called ATF) may be unlikely to decrease, thereby deteriorating the fuel economy of the vehicle.

In contrast, in the vehicular air conditioning device 1 according to the present embodiment, when the seat heater 90 is in operation and the blowing port mode is the foot mode which is selected when the target blowing temperature TAO is relatively high, the blowing capacity of the blower 32 is not increased until the waiting time WTm elapses since the IG switch is turned on.

Therefore, it is possible to suppress the increase in the amount of heat released from the cooling water in the heater core 36 to the blown air until the waiting time WTm elapses. As a result, the temperature of the cooling water can be promptly increased. As a result, it is possible to promote warming up of the engine EG and to improve the fuel economy of the vehicle. Furthermore, it is possible to reduce the energy consumption of the blower 32, and it is possible to further improve the fuel economy of the vehicle.

In addition to this, since the seat heater 90 is in operation at least until the waiting time WTm elapses, it is possible to prevent the warming feeling of the occupant from being impaired. That is, according to the vehicular air conditioning device 1 of the present embodiment, quick warming up of the engine EG can be realized without impairing the heating feeling of the occupant.

Further, according to the study of the inventors of the present invention, if the heating by only the seat heater 90 which is the auxiliary heating device is continued for a long time, it may be impossible to warm the feet or the like of the occupant and the heating feeling may decrease. In contrast, in the vehicle air conditioning device 1 according to the present embodiment, by appropriately determining the waiting time WTm, it is possible to prevent the feeling of warming of the occupant from being impaired.

In this embodiment, the waiting time WTm is increased with increase of the outside air temperature Tam as described in step S634 of FIG. 5. When the outside air temperature Tam rises, an occupant is unlikely to feel cold, and the temperature of the cooling water can be promptly increased, and accordingly the passenger's feeling of warming may not be impaired even if the waiting time WTm is increased.

Further, in this embodiment, the waiting time WTm is increased with increase of the inside air temperature Tr as described in step S635 of FIG. 5. When the inside air temperature Tr rises, an occupant is unlikely to feel cold, and the temperature of the cooling water can be promptly increased, and accordingly the passenger's feeling of warming may not be impaired even if the waiting time WTm is increased.

Further, in this embodiment, the waiting time WTm is decreased with increase of the near-window humidity RH as described as step S635 of FIG. 5. According to this, the anti-fogging property of the vehicle window glass W can be improved by operating the blower 32 promptly and increasing the ventilation amount.

In the vehicle air conditioning device 1 according to the present embodiment, as described in steps S65 to S68 in FIG. 4, when the air blowing port mode is in the bilevel mode, the blower voltage is determined without using the first provisional blower voltage f(time). Accordingly, in the bilevel mode, it is possible to raise the blower voltage without waiting for the lapse of the waiting time WTm after the IG switch is turned on.

In other words, in the vehicle air conditioning device 1 of the present embodiment, the waiting time WTm is decreased in the bilevel mode compared to the foot mode. As described above, the bilevel mode is an air blowing port mode which is likely to be selected in spring and autumn. Therefore, in the bilevel mode, the necessity of heating is smaller than in the foot mode, and air-conditioning comfortable for passengers can be realized by promptly blowing the blown air.

Further, in the vehicle air conditioning device 1 according to the present embodiment, as described with reference to FIG. 7, the blower port mode is switched to the defogger mode when it is determined that the blower voltage is equal to or lower than the minimum operating voltage Vmin as in the case where the waiting time have not elapsed since the IG switch is turned on while the seat heater 90 is in operation. According to this, it is possible to improve the anti-fogging property of the vehicle window glass W by blowing the blown air having the minimum air volume to the inner surface of the vehicle window glass W until the waiting time WTm elapses.

Further, in the vehicle air conditioning device 1 according to the present embodiment, as described with reference to FIG. 8, the cooling water pump 40a is stopped when it is determined that the blower voltage is equal to or lower than the minimum operating voltage Vmin as in the case where the waiting time have not elapsed since the IG switch is turned on while the seat heater 90 is in operation. According to this, it is possible to prevent the heat of the cooling water from being radiated by the heater core 36, and warming up the engine EG can be further promoted.

Further, in the vehicle air conditioning device 1 according to the present embodiment, as described with reference to FIG. 10, the compressor 11 is stopped when it is determined that the blower voltage is equal to or lower than the minimum operating voltage Vmin as in the case where the waiting time have not elapse since the IG switch is turned on while the seat heater 90 is in operation. That is, the refrigeration cycle device 10 is stopped.

According to this, the blown air flowing into the heater core 36 is not cooled by the evaporator 15. Therefore, it is possible to prevent the cooled blown air from being blown into the vehicle compartment. Furthermore, it is also possible to suppress the occurrence of condensation on the outside of the vehicle window glass W due to extremely cold blown air being blown to the inner surface of the vehicle window glass W, causing window fogging.

The present disclosure is not limited to the above embodiment and can be modified in various manners as described below without departing from the gist of the present disclosure.

In the above-described embodiment, an example where the seat heater is adopted as the auxiliary heating device is described. However, the auxiliary heating device is not limited to this. For example, a steering heater for heating the steering with an electric heater may be adopted as the auxiliary heating device. Further, as the auxiliary heating device, a radiation heater (halogen heater) for irradiating the heat source light toward the occupant may be adopted.

In the above-described embodiment, the occupant, who is the object of the auxiliary heating device giving a feeling of heating, is not described, but it may be the occupant sitting in the driver's seat. Exclusive auxiliary heating devices for giving a heating feeling to the occupants seated in the respective seats of the driver's seat, the passenger's seat, and the rear seat may be provided. When one of the auxiliary heating devices is operating, the blowing capacity may be increased after the lapse of the waiting time since the IG switch is tuned on.

Figure 8:
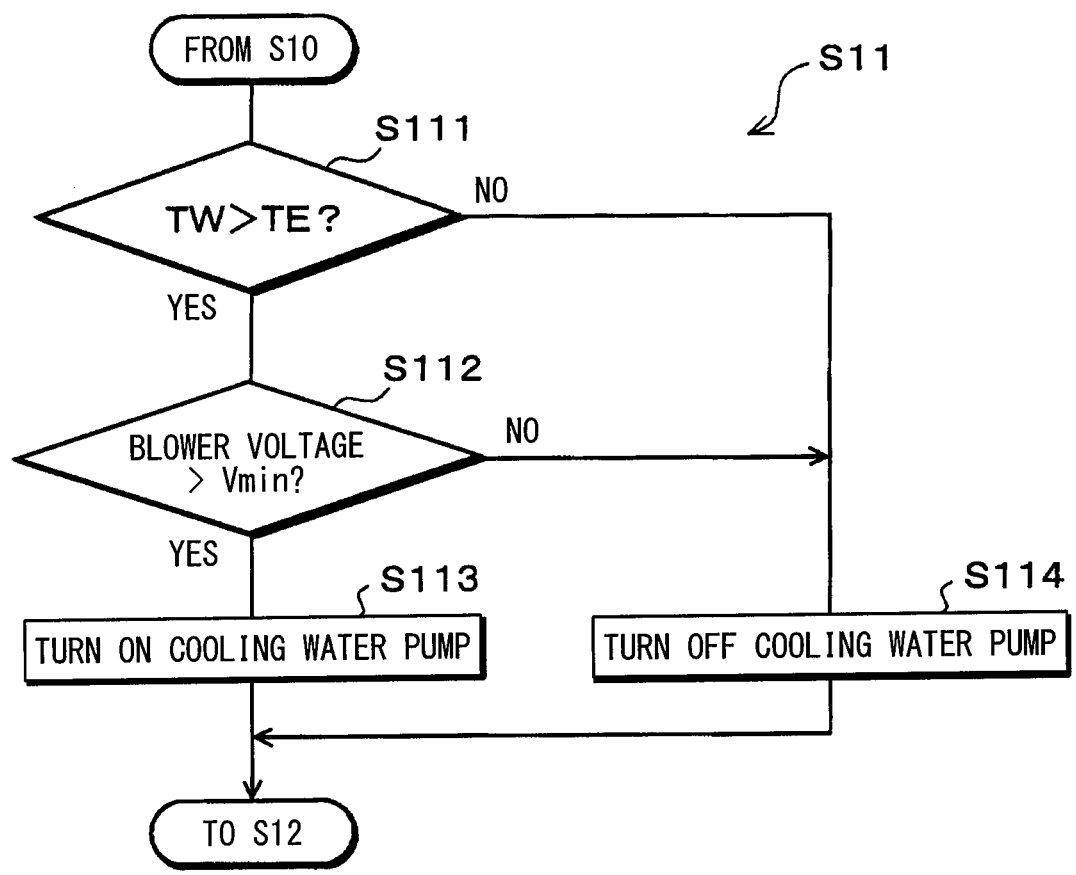
FIG. 8 is a flowchart illustrating a control process for determining an operation state of a water pump in the control process of the air-conditioning controller of the embodiment.
Figure 9:
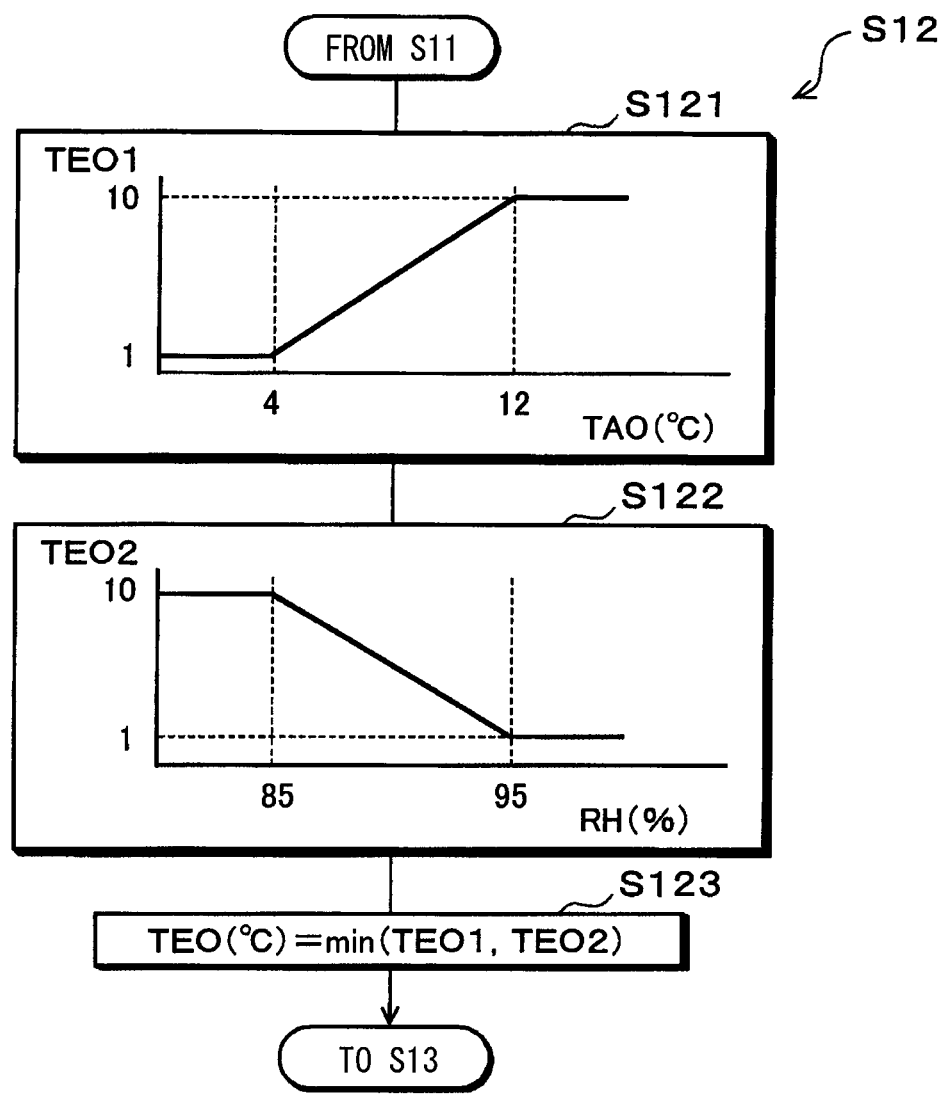
FIG. 9 is a flowchart illustrating a control process for determining a target evaporator temperature in the control process of the air-conditioning controller of the embodiment.

In the above-described embodiment, as described in steps S112 to S114 of FIG. 8, an example in which the cooling water pump 40a is stopped when the blower voltage is equal to or lower than the minimum operation voltage Vmin has been described. However, it is not limited to this.

For example, a circuit switching valve configured to switch between a circuit in which the cooling water flows through the bypass passage to bypass the heater core 36, and a circuit in which the coolant flows toward both the bypass passage and the heater core 36 may be provided. The cooling water may flow into the bypass passage when the blower voltage is equal to or lower than the minimum operation voltage Vmin, and the cooling water may flow into the heater core 36 when the blower voltage is equal to or lower than the minimum operation voltage Vmin. Further, in this case, the circuit switching valve is a flow rate adjusting device.

In the above-described embodiment, an example in which the vehicular air conditioning device 1 according to the present disclosure is applied to a vehicle that obtains the driving force for the vehicle from the internal combustion engine has been described, but the application of the vehicle air conditioning device 1 is not limited thereto. For example, the vehicular air-conditioning device 1 may be applied to a hybrid vehicle which obtains a driving force for vehicle traveling from both of an internal combustion engine and a traveling electric motor. Furthermore, the vehicular air-conditioning device 1 may be applied to an electric vehicle (including a fuel cell vehicle) traveling while obtaining a driving force from a running electric motor.

Further, the in-vehicle device accompanied by heat generation during operation is not limited to the internal combustion engine. For example, in the above-described electric vehicle, a traveling electric motor and an inverter that supplies electric power to the traveling electric motor are in-vehicle devices that generate heat during operation. By quickly completing the warm-up of the traveling electric motor and the inverter, the operation efficiency of the traveling electric motor and the inverter can be improved. Further, in a fuel cell vehicle, the fuel cell may be an in-vehicle device with heat generation during operation. By promptly completing the warm-up of the fuel cell, the power generation efficiency of the fuel cell can be improved.

While the present disclosure has been described with reference to embodiments thereof, it is to be understood that the disclosure is not limited to the embodiments and constructions. To the contrary, the present disclosure is intended to cover various modification and equivalent arrangements. In addition, while the various elements are shown in various combinations and configurations, which are exemplary, other combinations and configurations, including more, less or only a single element, are also within the spirit and scope of the present disclosure.

What is claimed is:

1. A vehicular air conditioning device comprising:
   a blower configured to send blown air to a vehicle compartment;
   a heating heat exchanger configured to heat the blown air by exchanging heat between the blown air and cooling water of an in-vehicle device that emits heat during operation;
   an auxiliary heater configured to generate heat; and
   a blower controller configured to control an operation of the blower, wherein
   the blower controller is configured to increase a blowing capacity of the blower with increase of a temperature of the cooling water, and
   the blower controller, during operation of the auxiliary heater, increases the blowing capacity after a waiting time during which the increase of the blowing capacity is prohibited has elapsed since a start-up switch of a vehicle system is turned on.

2. The vehicular air conditioning device according to claim 1, wherein
   the blower controller is configured to increase the waiting time with increase of an outside air temperature.

3. The vehicular air conditioning device according to claim 1, wherein
   the blower controller is configured to increase the waiting time with increase of an inside air temperature of the vehicle compartment.

4. The vehicular air conditioning device according to claim 1, further comprising:
   a casing defining
      an air passage of the blown air sent to the vehicle compartment, and
      a plurality of opening holes through which the blown air is blown into the vehicle compartment; and
   blowing port mode doors configured to switch a blowing port mode by adjusting opening areas of the plurality of opening holes, wherein
   the blowing port mode includes
      a bilevel mode in which the blown air is blown at least toward both an upper body and a foot of the occupant, and
      a foot mode in which the blown air is blown toward the foot of the occupant, and
   the blower controller is configured to decrease the waiting time in the bilevel mode compared to the waiting time in the foot mode.

5. The vehicular air conditioning device according to claim 1, further comprising:
a casing defining
an air passage of the blown air sent to the vehicle compartment, and
a plurality of opening holes through which the blown air is blown into the vehicle compartment;
blowing port mode doors configured to switch a blowing port mode by adjusting opening areas of the plurality of opening holes; and
a blowing port mode controller configured to control an operation of the blowing port mode doors, wherein
the blowing port mode includes a defogger mode in which the blown air is blown at least toward a vehicle window glass, and
the blowing port mode controller, during operation of the auxiliary heater, controls the operation of the blowing port mode doors to switch into and keep the defogger mode until the waiting time has elapsed since the start-up switch of the vehicle system is turned on.

6. The vehicular air conditioning device according to claim 1, further comprising:
a flow rate adjuster configured to adjust a flow rate of the cooling water flowing into the heating heat exchanger; and
a flow rate adjuster controller configured to control an operation of the flow rate adjuster, wherein
the flow rate adjuster controller, during operation of the auxiliary heater, sets the flow rate of the cooling water to zero until the waiting time has elapsed since the start-up switch of the vehicle system is turned on.

7. The vehicular air conditioning device according to claim 6, further comprising
a cooling device configured to cool the blown air; and
a cooling capacity controller configured to control a cooling capacity of the cooling device, wherein
the cooling capacity controller stops the cooling device when the flow rate adjuster controller sets the flow rate of the cooling water to zero.

8. The vehicular air conditioning device according to claim 1, further comprising:
a humidity detector located in the vehicle compartment and configured to detect a near-window humidity of air near the vehicle window glass, wherein
the blower controller is configured to decrease the waiting time with increase of the near-window humidity detected by the humidity detector.

9. The vehicular air conditioning device according to claim 1, wherein
the in-vehicle device is an internal combustion engine.

* * * * *